(12) United States Patent
Kretschmer

(10) Patent No.: US 8,634,532 B2
(45) Date of Patent: Jan. 21, 2014

(54) METHOD FOR ESTABLISHING AND MANAGING A CONNECTION OF A MOBILE COMMUNICATION TERMINAL TO A PRIVATE BRANCH EXCHANGE

(75) Inventor: Sabine Kretschmer, Essen (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 260 days.

(21) Appl. No.: 13/146,545

(22) PCT Filed: Sep. 17, 2010

(86) PCT No.: PCT/EP2010/005731
§ 371 (c)(1),
(2), (4) Date: Jul. 27, 2011

(87) PCT Pub. No.: WO2011/035872
PCT Pub. Date: Mar. 31, 2011

(65) Prior Publication Data
US 2011/0280385 A1 Nov. 17, 2011

(30) Foreign Application Priority Data
Sep. 24, 2009 (DE) .......................... 10 2009 042 949

(51) Int. Cl.
H04M 3/42 (2006.01)

(52) U.S. Cl.
USPC .................. 379/211.01; 379/142.06; 455/417

(58) Field of Classification Search
USPC .......... 379/211.01–211.02, 225; 455/417, 445
See application file for complete search history.

(56) References Cited

U.S. PATENT DOCUMENTS 5,729,599 A * 3/1998 Plomondon et al. ..... 379/211.02
6,141,545 A * 10/2000 Begeja et al. ................. 455/417
6,285,750 B1 9/2001 Brachman et al.
6,795,537 B1 * 9/2004 Gilbert ...................... 379/93.25
2008/0305759 A1 12/2008 Tervaluoto et al.
2009/0141881 A1 6/2009 Lederer et al.

FOREIGN PATENT DOCUMENTS

| CN | 1622569 A | 6/2005 |
| CN | 1894848 A | 1/2007 |
| DE | 10149720 A1 | 4/2003 |
| EP | 0841797 A2 | 5/1998 |

OTHER PUBLICATIONS

International Search Report for PCT/EP2010/005731 dated Jan. 18, 2011 (Form PCT/ISA/210) (German Translation).

(Continued)

*Primary Examiner* — Duc Nguyen
*Assistant Examiner* — Assad Mohammed
(74) *Attorney, Agent, or Firm* — Buchanan Ingersoll & Rooney PC (57) ABSTRACT

The invention relates to an internal communication terminal (iK1, iK2, iK3) of a private branch exchange (PBX), having at least one device (E11, . . . , E32), by means of the activation (act) of which said internal communication terminal (iK) or the private branch exchange (PBX) is put into a state in which said internal communication terminal or the private branch exchange identifies the telephone number of an incoming call from an external communication terminal (eK). The identified telephone number of the external communication terminal is then associated with the internal communication terminal in a database (DB), provided that the type of the association of said external communication terminal with said internal communication terminal connected with the activation of said device is not yet entered in the database. Otherwise, said association is deleted.

18 Claims, 4 Drawing Sheets

(56) References Cited

OTHER PUBLICATIONS

International Search Report for PCT/EP2010/005731 dated Jan. 18, 2011 (Form PCT/ISA/210) (English Translation).
3rd Generation Partnership Project; Technical Specification Group Core Network and Terminals; Completion of Communications to Busy Subscriber (CCBS) Completion of Communications by No Reply (CCNR) using IP Multimedia (IM) Core Network (CN) subsystem; Protocol specification; (Release 9), 3GPP Standard; 3GPP TS 24.642, Sep. 1, 2009 3rd Generation Partnership Project (3GPP), Mobile Competence Centre ; 650, route des Lucioles ; F-06921 Sophia-Antipolis Cedex ; France, Nr:V9.0.0, pp. 1-44.
Written Opinion of the International Searching Authority for PCT/EP2010/005731 dated Jan. 18, 2011 (Form PCT/ISA/237) (German Translation).
Written Opinion of the International Searching Authority for PCT/EP2010/005731 dated Jan. 18, 2011 (Form PCT/ISA/237) (English Translation).
International Preliminary Report on Patentability for PCT/EP2010/005731 dated Mar. 27, 2012 (Forms PCT/IB/373, PCT/ISA/237) (German Translation).
International Preliminary Report on Patentability for PCT/EP2010/005731 dated Mar. 27, 2012 (Forms PCT/IB/373, PCT/ISA/237) (English Translation).

* cited by examiner

METHOD FOR ESTABLISHING AND MANAGING A CONNECTION OF A MOBILE COMMUNICATION TERMINAL TO A PRIVATE BRANCH EXCHANGE

CROSS-REFERENCE TO RELATED APPLICATIONS

This application is the United States national phase under 35 U.S.C. §371 of PCT International Application No. PCT/EP2010/005731, filed on Sep. 17, 2010, and claiming priority to German Application No. 10 2009 042 949.2 filed on Sep. 24, 2009.

BACKGROUND OF THE INVENTION

1. Field of the Invention

Embodiments of the invention are directed to management of connections from mobile communication terminals to private branch exchanges.

2. Background of the Related Art

Users of modern private branch exchanges increasingly need to be reachable at any time, even when they are not at their workplace at that time. As a rule, private branch exchanges involve multiple internal communication terminals, which are often designed as landline terminals. If a participant wishes to be reachable even if he is not near his internal communication terminal, he often sets up call diversion to a mobile communication terminal, which generally is not part of the internal communication terminals of the private branch exchange.

In other cases, a subscriber of a private branch exchange may wish to be reachable even when he is at a stationary communication terminal, for example near his private landline connection, which is also not an internal communication terminal of the private branch exchange.

In these and similar cases, the problem of connecting an external communication device to a private branch exchange arises and from the viewpoint of the subscriber, it should be possible to set it up and manage it as easily as possible. Management of such connections includes, in particular, the temporary activation and deactivation of call diversion to various external communication terminals.

BRIEF SUMMARY OF THE INVENTION

According to an embodiment of the invention, a method or a private branch exchange is provided in which an internal communication terminal of the private branch exchange includes at least one device which, when activated, places this internal communication terminal or the private branch exchange in a state in which this internal communication terminal or the private branch exchange identifies the telephone number of a call arriving from an external communication terminal. The identified telephone number of the external communication terminal is then associated with the internal communication terminal in a database, if the type of association of this external communication terminal with the internal communication terminal and linked to the activation of this device has not yet been entered into the database. Otherwise this association is deleted.

In the context of the description of the present invention, a private branch exchange or telephone system shall refer to any type of switching equipment that connects several terminal units (i.e., communication terminals) such as telephone, fax, answering machine or similar communication terminals both to each other and to the public telephone network. A basic operating element for performing this function is a so-called switching matrix, for example, whose input and output channels are switched by a controller. A private branch exchange or telephone system can be connected to the public telephone network using various techniques such as a classic analog telephone connection or an ISDN line, or also based on the Internet protocol (in the case of a communication network based on the Internet protocol). The latter in particular enable the convergence of information and telecommunication technologies.

In this context, telephone systems are developing increasingly in the direction of purely software-based systems that build on already standardized and commercially available components.

DETAILED DESCRIPTION OF THE INVENTION

For internal communication terminals, a private branch exchange uses especially digital and/or analog connections called ports. Depending on the type of private branch exchange, internal communication terminals can be connected by cable or wireless, for example according to the DECT standard.

In general, the internal communication terminals and the private branch exchange are spatially separated and therefore connected to each other via suitable installation cables or via wireless distribution networks (e.g., according to the DECT standard). In recent years, private branch exchanges using LAN connections have gained popularity for the use of IP telephony and to network several private branch exchanges via the Internet.

The following designations are often used in place of the term telephone system: telecommunication installation (TC installation), telecommunication system (TC system), subscriber switching system, private branch exchange (PBX), private automatic branch exchange (PABX). In addition to conventional implementations of private branch exchanges, there are also Internet-based private branch exchanges (Net-PBX), so-called Centrex solutions (Central Office exchange), where a public telephone provider provides a telephone system function as well as solely software-based exchange systems realized on the Internet using the so-called voice-over-IP technology.

A communication terminal in terms of the present invention refers to any device a subscriber can use to make telephone calls. This includes in particular stationary telephone terminals, mobile phones, cordless phones, personal digital assistants (PDAs), but also notebooks, for example, with the appropriate hardware (microphone) and similar devices.

An internal communication terminal shall refer to any communication terminal that is managed as a part of the private branch exchange and that has an internal extension number within the private branch exchange. An external communication terminal, on the other hand, shall refer to any communication terminal that is not part of the internal communication terminals.

In a method according to the invention for establishing and managing a connection from an external communication terminal (eK, eK1, eK2) to a private branch exchange (PBX), an internal communication terminal (iK, iK1, iK2, iK3) of the private branch exchange includes at least one device (E, E11, E12, E21, E22, E31, E32) whose activation (act) puts this internal communication terminal or the private branch exchange into a state in which said internal communication terminal or the private branch exchange identifies the telephone number of an incoming call from an external communication terminal and associates the identified telephone number of the external communication terminal with the internal communication terminal in a database (DB), provided that the type of the association between said external communication terminal and said internal communication terminal related to the activation of said device is not yet entered in the database and where otherwise said association is deleted.

Preferably at least one device is provided whose activation generates an association that causes incoming calls to the internal communication terminal to be diverted to the associated external communication terminal. Preferably this association applies only to the external communication terminal from which, before or during activation of the respective device, there is an incoming call for the internal communication terminal. This shall be explained based on an example:

A subscriber of a private branch exchange wishes to set up call diversion from his internal communication terminal, for example his landline telephone that is part of the private branch exchange, to his mobile telephone. To do this, he calls his landline terminal that is part of the private branch exchange from his mobile phone and presses, for example, a respective button at this landline terminal. Pressing this button has the effect that the mobile communication terminal of this subscriber is now associated in the database of the private branch exchange with the landline telephone that is part of the private branch exchange in such a manner that future incoming calls to the landline telephone that is part of the private branch exchange are forwarded to his mobile communication terminal, which is not part of the private branch exchange.

Thus, in this example, the invention allows for a very convenient way of establishing call diversion from an internal communication terminal of a private branch exchange to an external communication terminal, in this case a mobile communication terminal.

However, the invention is by no means limited to this example. Instead of call diversion, which should include in particular the performance feature of a call transfer, i.e., the immediate transfer of an incoming telephone call to another communication terminal, other performance characteristics of private branch exchanges can be linked to an association between an internal communication terminal of a private branch exchange and an external communication terminal. Examples of such performance features include "completion of calls to busy subscriber" (CCBS) or similar performance features. Within the group of performance features which are collectively designated as "call diversion" all sub-categories of this performance feature are conceivable as implementation options of an association in the database.

Call diversion is the generic term for various forms of call forwarding and call deflection services. With so-called "call forwarding—unconditional," the transfer occurs immediately. In a variation of call diversion referred to as "call forwarding—busy," the transfer occurs only if the target subscriber is busy. In the variation of call diversion referred to as "call forwarding on no reply," the transfer occurs only if the subscriber does not answer after a certain time, for example after 15 seconds.

In connection with the present invention, it is also possible to implement a variation of call diversion designated as "call forwarding—parallel", in which the internal communication terminal and the associated external communication terminal both ring—i.e., indicate an incoming call to the subscriber—simultaneously. Furthermore, variations of call diversion often designated as "call deflection" are possible consequences of an association between an internal communication terminal and an external communication terminal, wherein call deflection differs from call forwarding in that here the transfer is initiated on a case-by-case basis (for each call) and is not configured for a specific target.

In one preferred embodiment of the invention, the internal telephone number of the internal communication terminal of the private branch exchange, and not the telephone number of the external communication terminal to which the incoming call will be forwarded, is always signaled or communicated to the calling subscriber.

On the other hand, it is also possible for the telephone number of the external communication terminal to be displayed for certain subscribers. In another preferred embodiment of the invention, a processing device is used to process the caller number of a calling external communication terminal, prior to entry of the association in the database, into a number that can be dialed. In many cases, this processing function will consist of inserting leading zeros or deleting unnecessary network area codes.

Continuing the description of our example mentioned above, it is preferred according to the invention to set up the private branch exchange such that activation of a device (E11, . . . , E32) of an internal communication terminal results in deletion of the association if the device is activated when an external communication terminal is already associated with the internal number of the internal communication terminal in connection with this device. In this case, the association is deleted.

For example, if the subscriber described above wishes to deactivate call forwarding to his mobile communication terminal, he simply presses the button that he used before to activate call forwarding during an incoming call from his mobile terminal, which results in deactivation of call forwarding.

This simple example already demonstrates clearly how the present invention enables very efficient and user-friendly establishment and management of a connection from external communication terminals to a private branch exchange.

Figure 1:
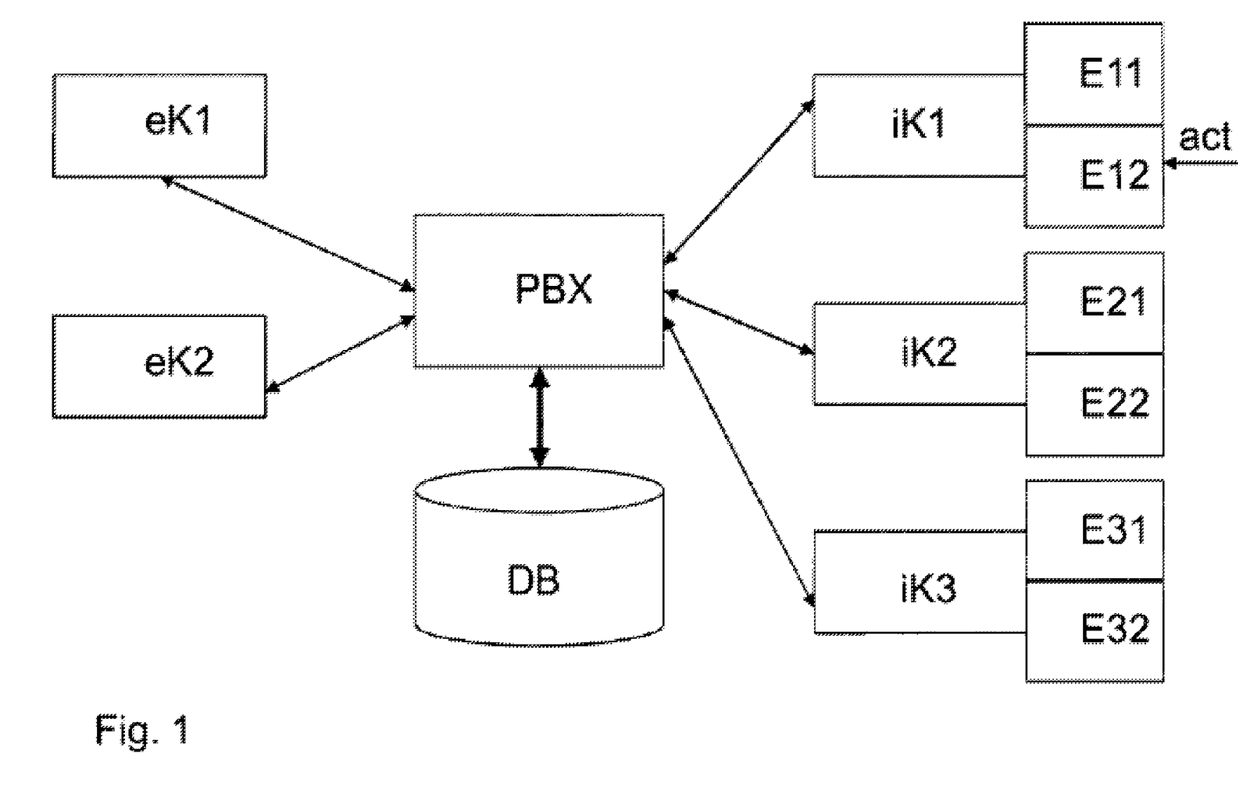
FIG. 1—a schematic representation of the fundamental structure of a private branch exchange according to the invention and of the communication connection within this private branch exchange.

FIG. 1 shows a basic structure of a private branch exchange based on a preferred embodiment of the invention. The private branch exchange (PBX) has a database (DB) and in this case, three internal communication terminals iK1, iK2, iK3, in this case with two devices each to activate an association E11, E12, E21, E22, E31, E32. Activating (act) the device E12 of the internal communication terminal iK1 causes the association of an external communication terminal (eK) if, before or during activation of this device, there is an incoming call from this external communication terminal.

Figure 2:
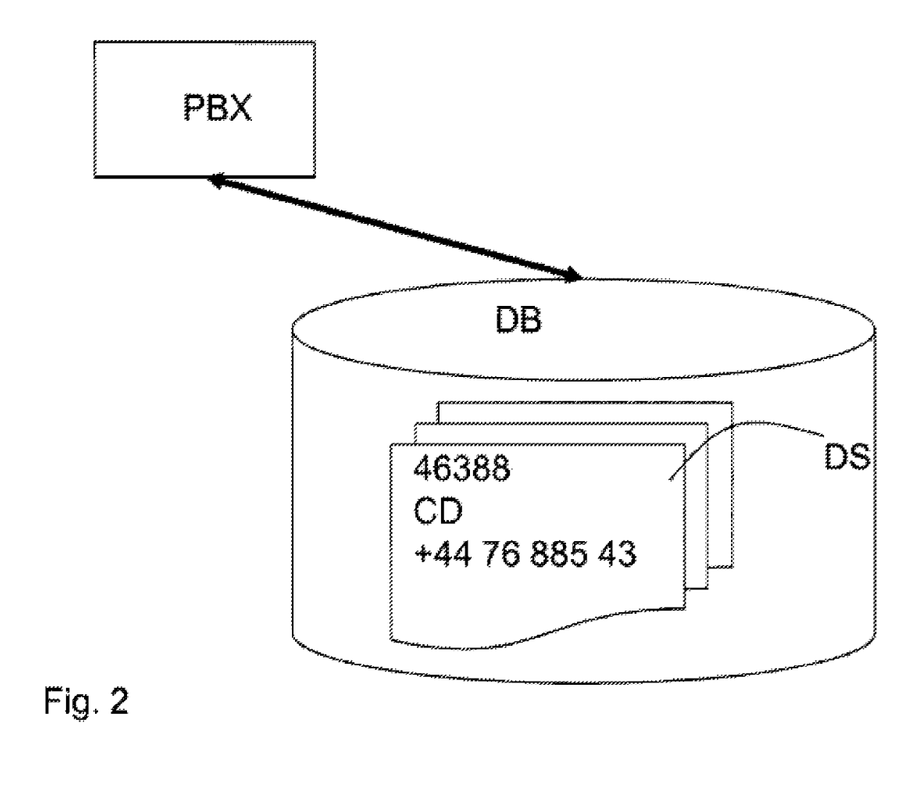
FIG. 2—a preferred embodiment of a data management function within a database of a private branch exchange according to the invention.

As shown schematically in FIG. 2, the association is established preferably through a respective entry in the database (DB) of the private branch exchange (PBX), which provides, for example, a data set (DS) for each association, wherein the data set provides to an internal communication terminal, for example with the internal subscriber number 46388, a performance feature, in this case call diversion (CD), and an external communication terminal, in this case with the subscriber number +447688543, which is associated with this internal communication terminal.

Figure 3:
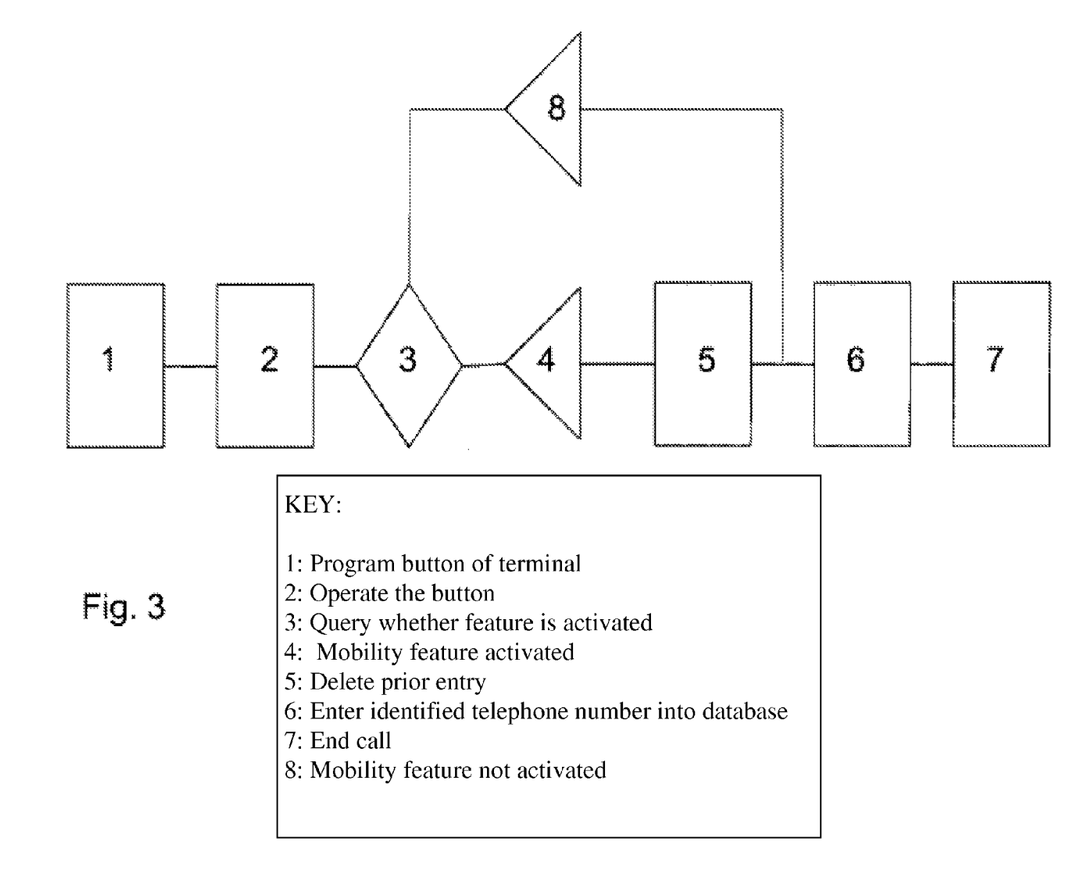
FIG. 3—a flow chart associating an identified telephone number of an external communication terminal in a database with an internal communication terminal.

As exemplified in FIG. 3, associating an identified telephone number of an external communication terminal in a database (DB) with an internal communication device can proceed in the following sequence: If in a first step, for example, a respective button of an internal communication terminal has been programmed (1) appropriately, this button can be operated by a subscriber in a second step (2). If the system is programmed accordingly ("mobility feature activated"=yes; 4), which may be queried or checked in a third step (3), an existing prior entry is deleted from the database (5) and an identified new telephone number is entered into the database (6). Otherwise ("mobility feature activated"=no; 8), the step of deleting the prior entry is skipped (5) and entry of the identified new telephone number can occur immediately (6). The call for which the telephone number was identified can then be ended (7).

Figure 4:
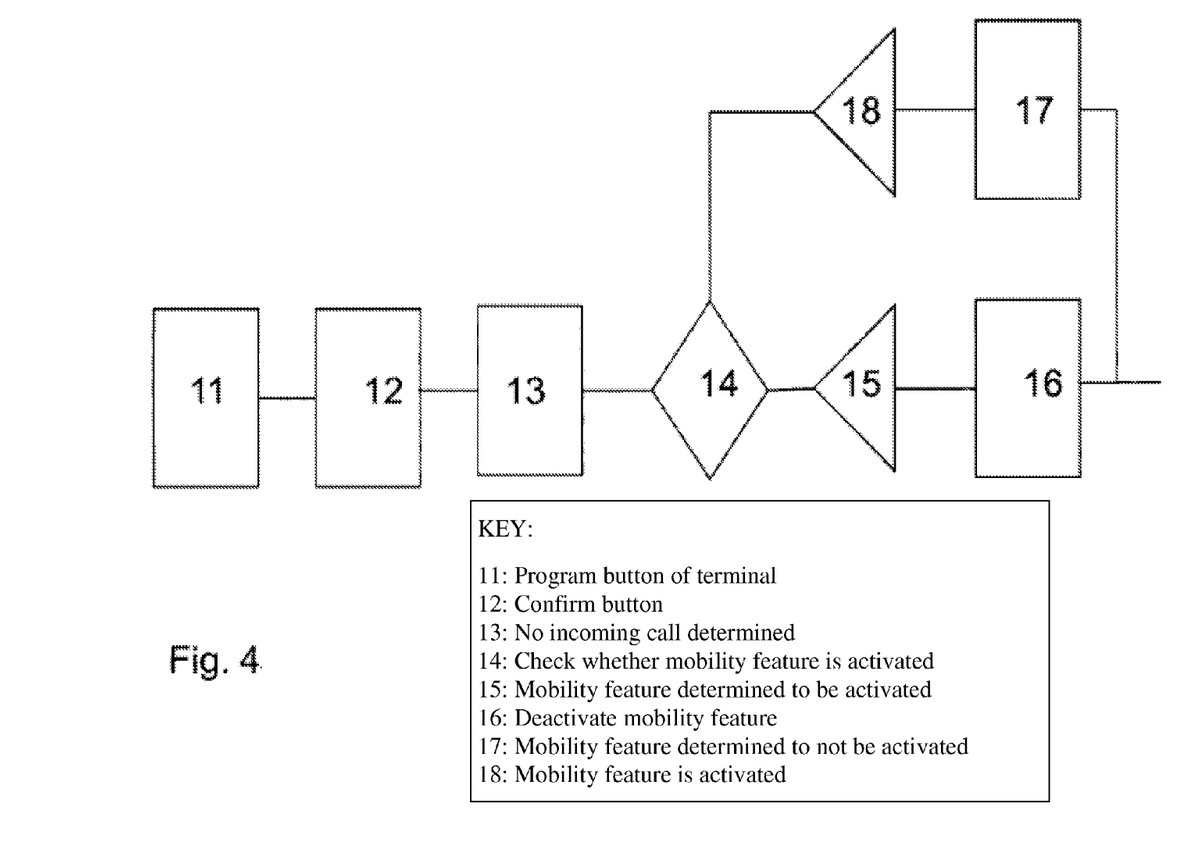
FIG. 4—a flow chart for activating or deactivating a call forwarding function.

The mobility feature can be activated or deactivated in a series of steps, shown schematically in FIG. 4: In an appropriately programmed environment (11), where for example a button (E11) of an internal communication terminal (iK1) is programmed appropriately, a subscriber confirms (12) that button. It is determined (13) that there is no incoming call with a telephone number that could be identified. If the check (14) of whether the mobility feature is activated is positive (15), then the mobility feature is deactivated (16); otherwise (18) it is activated (17).

The invention claimed is:

1. A method for establishing and managing a connection from an external communication terminal to a private branch exchange said private branch exchange connected to an internal communication terminal including at least one first device, the method comprising:

activating the first device a first time resulting in placing the internal communication terminal or the private branch exchange into a state in which said internal communication terminal or the private branch exchange is configured to identify a telephone number of a first incoming call from the external communication terminal, and associating, by the internal communication terminal or private branch exchange, the identified telephone number of the external communication terminal with the internal communication terminal in a database to create a type of association provided that the type of the association between said external communication terminal and said internal communication terminal connected with the activation of said first device is not yet entered in the database, the created type of association diverting subsequent calls intended for the internal communication terminal so that the subsequent calls are routed to the external communication terminal;

the external device initiating the first incoming call for the internal communication terminal;

the internal communication terminal or private branch exchange identifying the telephone number of the external communication terminal in response to receipt of the first incoming call and in response to the first time activation of the first device;

the internal communication terminal or the private branch exchange creating the type of association in the database between the external communication terminal and the internal communication terminal in response to the receipt of the first incoming call and the first time activation of the first device and the type of association not being present in the database;

diverting subsequent calls directed to the internal communication terminal that occur after creation of the type of association in the database so that the subsequent calls are diverted to the external communication terminal;

after creation of the type of association, activating the first device of the internal communication terminal a second time resulting in placing the internal communication terminal or the private branch exchange into a state in which said internal communication terminal or the private branch exchange is configured to identify the telephone number of the external communication terminal during a second incoming call from the external communication terminal for deleting the created type of association between the internal communication terminal and the external communication terminal from the database;

the external communication terminal initiating the second incoming call; and the internal communication terminal or the private branch exchange deleting the type of association between the external communication terminal and the internal communication terminal from the database in response to receipt of the second incoming call and the second time activation of the first device.

2. The method of claim 1, wherein the type of association causes incoming calls to the internal communication terminal to be diverted to the external communication terminal via call forwarding or call deflection.

3. The method of claim 1, wherein the first time activation of the first device occurs during or after the first incoming call is initiated by the external communication terminal.

4. The method of claim 3, comprising, prior to entering the type of association into the database, processing the telephone number of the external communication terminal by a processing device of the private branch exchange into a number that can be dialed by the private branch exchange for diverting calls intended for the internal communication terminal to the external communication terminal.

5. The method of claim 1, wherein the internal communication terminal has an internal telephone number and wherein the method further comprises:

the private branch exchange signaling a third communication terminal involved in one of the subsequent calls intended for the internal communication terminal that is diverted to the external communication terminal to identify the internal telephone number of the internal communication terminal to that third communication terminal.

6. The method of claim 1, wherein the second time activation of the first device occurs during the second incoming call from the external communication terminal or after receipt of the second incoming call.

7. The method of claim 1 wherein the internal communication terminal is a telephone.

8. A private branch exchange comprising:

at least one internal communication terminal, said at least one internal communication terminal comprising at least one first device whose activation at a first time puts the internal communication terminal or a private branch exchange into a state in which said internal communication terminal or said private branch exchange identifies a telephone number of a first incoming call from an external communication terminal and associates the identified telephone number of the external communication terminal with the internal communication terminal in a database, provided that the type of the association between said external communication terminal and said internal communication terminal connected with activation of said device is not yet entered in the database, the created type of association diverting subsequent calls intended for the internal communication terminal so that the subsequent calls are routed to the external communication terminal;

the internal communication terminal or private branch exchange identifying the telephone number of the external communication terminal in response to receipt of the first incoming call and in response to the first time activation of the first device;

the internal communication terminal or the private branch exchange creating the type of association in the database between the external communication terminal and the internal communication terminal in response to the receipt of the first incoming call and the first time activation of the first device and the type of association not being present in the database;

the internal communication terminal or the private branch exchange diverting calls directed to the internal communication terminal that occur after creation of the type of association in the database so that the subsequent calls are diverted to the external communication terminal when the type of the association is in the database;

after creation of the type of association, activating the first device a second time resulting in placing the internal communication terminal or the private branch exchange into a state in which said internal communication terminal or the private branch exchange is configured to identify the telephone number of the external communication terminal during a second incoming call from the external communication terminal for deleting the created type of association between the internal communication terminal and the external communication terminal from the database; and the internal communication terminal or the private branch exchange deleting the type of association between the external communication terminal and the internal communication terminal from the database in response to receipt of the second incoming call and the second time activation of the first device.

9. The private branch exchange of claim 8, wherein the type of association causes incoming calls to the internal communication terminal to be diverted to the external communication terminal via call forwarding or call deflection.

10. The private branch exchange of claim 8, wherein activation of the first device at the first time occurs during the first incoming call or after the first incoming call is received and causes the association between said external communication terminal and said internal communication terminal to be created.

11. The private branch exchange of claim 8, wherein prior to entering the association into the database, the caller number of the external communication terminal is processed by a processing device of the private branch exchange into a number that can be dialed by the private branch exchange for diverting calls intended for the internal communication terminal to the external communication terminal.

12. The private branch exchange of claim 8, wherein the internal communication terminal has an internal telephone number and wherein the method further comprises:

the private branch exchange signaling a third communication terminal involved in one of the subsequent calls intended for the internal communication terminal that is diverted to the external communication terminal to identify the internal telephone number of the internal communication terminal to that third communication terminal.

13. The private branch exchange of claim 8, wherein the second time activation of the first device occurs during the second incoming call from the external communication terminal or after receipt of the second incoming call.

14. An internal communication terminal for connecting to a private branch exchange said at least one internal communication terminal comprising:

at least one first device whose activation at a first time puts the internal communication terminal or the private branch exchange into a state in which said internal communication terminal or said private branch exchange identifies a telephone number of an external communication terminal during a first incoming call from the external communication terminal and associates the identified telephone number of the external communication terminal with the internal communication terminal in a database, provided that the type of the association between said external communication terminal and said internal communication terminal connected with activation of said first device is not yet entered in the database, the created type of association configured so that subsequent calls intended for the internal communication terminal are diverted so that the subsequent calls are routed to the external communication terminal;

the internal communication terminal or private branch exchange identifying the telephone number of the external communication terminal in response to receipt of the first incoming call and in response to the first time activation of the first device;

the internal communication terminal or the private branch exchange creating the type of association between the external communication terminal and the internal communication terminal in response to the receipt of the first incoming call and the first time activation of the first device and the type of association not being present in the database;

the internal communication terminal or the private branch exchange diverting calls directed to the internal communication terminal that occur after creation of the type of association in the database so that the subsequent calls are diverted to the external communication terminal when the type of the association is in the database;

after creation of the type of association, activating the first device a second time resulting in placing the internal communication terminal or the private branch exchange into a state in which said internal communication terminal or the private branch exchange is configured to identify the telephone number of the external communication terminal during a second incoming call from the external communication terminal for deleting the created type of association between the internal communication terminal and the external communication terminal from the database; and the internal communication terminal or the private branch exchange deleting the type of association between the external communication terminal and the internal communication terminal from the database in response to receipt of the second incoming call and the second time activation of the first device.

15. The internal communication terminal of claim 14, wherein the internal communication terminal has an internal telephone number and wherein the method further comprises:

the private branch exchange signaling a third communication terminal involved in one of the subsequent calls intended for the internal communication terminal that is diverted to the external communication terminal to identify the internal telephone number of the internal communication terminal to that third communication terminal.

16. The internal communication terminal of claim 14, wherein the type of association causes incoming calls to the internal communication terminal to be diverted to the external communication terminal via call forwarding or call deflection.

17. The internal communication terminal of claim 14, wherein the first time activation of the first device during or after the first incoming call causes the association between said external communication terminal and said internal communication terminal to be created.

18. The internal communication terminal of claim 14, wherein prior to entering the association into the database, the caller number of the external communication terminal is processed by a processing device of the private branch exchange into a number that can be dialed by the private branch exchange for diverting calls intended for the internal communication terminal to the external communication terminal.

* * * * *